(12) United States Patent
Vannan et al.

(10) Patent No.: US 8,151,840 B2
(45) Date of Patent: Apr. 10, 2012

(54) METHOD OF MANUFACTURING A NEW AIRLESS OR PNEUMATIC TIRE HAVING A REINFORCED RUBBER STRUCTURE AND A POLYURETHANE TREAD

(76) Inventors: Frederick Forbes Vannan, Clinton, OH (US); Mark Howard Dickerhoff, Clinton, OH (US)

( * ) Notice: Subject to any disclaimer, the term of this patent is extended or adjusted under 35 U.S.C. 154(b) by 1114 days.

(21) Appl. No.: 12/009,917

(22) Filed: Jan. 23, 2008

(65) Prior Publication Data
US 2009/0184443 A1    Jul. 23, 2009

(51) Int. Cl.
*B29C 45/14*    (2006.01)
*B60C 11/00*    (2006.01)
(52) U.S. Cl. .......... 152/209.1; 156/125; 156/128.1; 264/279; 425/111

(58) Field of Classification Search ............ 156/125, 156/96, 128.1, 128.6, 130.5; 264/328.3, 264/279; 152/452, 209.1; 425/24, 111
See application file for complete search history.

(56) References Cited

U.S. PATENT DOCUMENTS

| | | | | |
|---|---|---|---|---|
| 2,873,790 | A * | 2/1959 | Cadwell et al. | 156/125 |
| 3,903,227 | A * | 9/1975 | Sarumaru | 264/501 |
| 4,704,176 | A * | 11/1987 | Botzman | 156/125 |
| 7,143,797 | B2 | 12/2006 | Vannan | |
| 7,524,446 | B2 * | 4/2009 | Zhang et al. | 264/135 |
| 2005/0092424 | A1 * | 5/2005 | Zhang et al. | 156/125 |
| 2006/0118223 | A1 * | 6/2006 | Maeda | 152/323 |

FOREIGN PATENT DOCUMENTS
JP    2005-075152 A *   3/2005
* cited by examiner

*Primary Examiner* — Geoffrey L Knable

(57) ABSTRACT

A method of manufacturing a new tire having a reinforced rubber structure and a polyurethane tread.

4 Claims, 1 Drawing Sheet

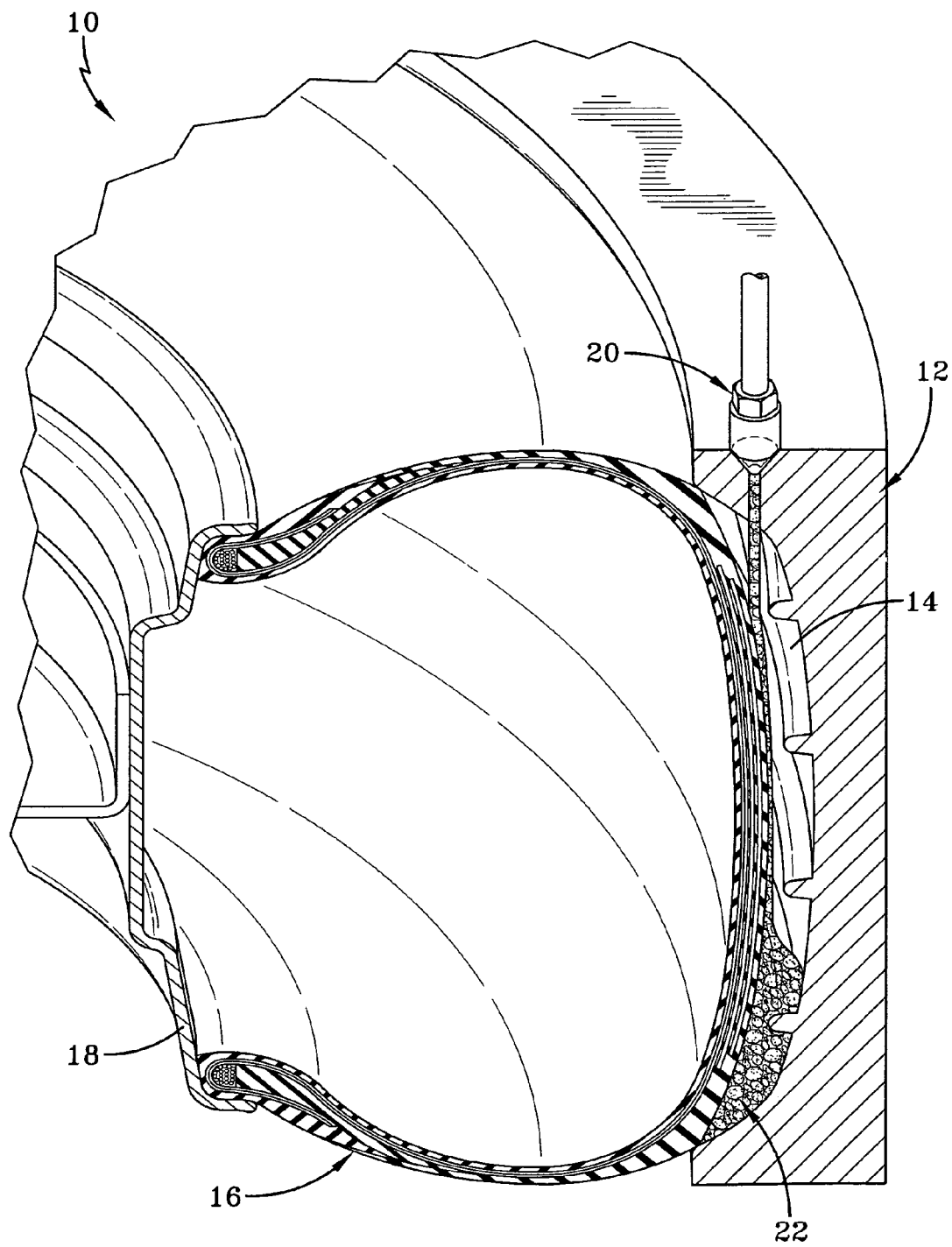

METHOD OF MANUFACTURING A NEW AIRLESS OR PNEUMATIC TIRE HAVING A REINFORCED RUBBER STRUCTURE AND A POLYURETHANE TREAD

U.S. PATENT REFERENCES

U.S. Pat. No. 7,143,797 B2 Airless Tire

BACKGROUND

Rubber tires have been manufactured using essentially the same process for about one hundred years. The process includes the following steps: Rubber is mixed with other chemicals on mills or in banburys, flat rubber components are formed with calenders, contoured rubber components are formed with calenders or extruders, reinforcing fabrics and wires for plies and belts are coated with rubber on a calender train and subsequently cut to bias angles, solid wire is insulated with rubber on an extruder and subsequently wound into beads, all components are assembled on a building drum or mandrel, the assembled tire is placed in a hot mold having the shape of the finished tire including tread pattern and expanded out to the mold surface by internal pressure, after significant time has passed the completely vulcanized tire is removed from the mold and is ready for service.

Vulcanization time varies according to tire size and amount of rubber. Vulcanization times vary from ten minutes for passenger tires to fifteen hours for large earthmover tires.

A rubber tire must remain in the hot mold under pressure until every particle of rubber is vulcanized. Heat from the mold and from inside the tire slowly reaches the center of mass because rubber is a thermal insulator having low thermal conductivity. The tread component of a tire is one of the more massive components thereby slowing heat transfer to the center of tire mass and increasing the time that a tire must remain in the mold. Longer vulcanization time in a mold increases the number of molds required for the same output.

A rubber treaded tire must be built smaller than the inside of the mold in order to fit into the tread pattern forming part of the mold and then after the mold is closed the tire is expanded with high internal pressure until rubber flows into the mold's tread pattern sometimes causing flow cracks or imperfectly molded tread lugs and internal stresses which adversely affect field performance.

An inflated vulcanized rubber treaded tire can never be as round as the mold in which it was vulcanized because it was molded with high internal pressure but operates in the field at significantly lower inflation pressure and its roundness is no longer controlled by the mold but by the reinforcing plies, belts and beads within its structure. Out of round tires do not ride as smoothly as round ones.

SUMMARY OF INVENTION

This invention is a method of manufacturing a new airless or pneumatic tire having a rubber structure and a polyurethane tread. The reinforced rubber structure is assembled without a tread component and vulcanized in a mold having no tread pattern. The tread area of the reinforced rubber structure is buffed to promote adhesion to polyurethane. The vulcanized reinforced rubber structure is inflated inside a mold having the desired tread pattern. Liquid polyurethane is poured or injected into the mold filling the space between the inflated reinforced rubber structure and the mold having the tread pattern. After the polyurethane has solidified, the completed tire is removed from the mold and is ready for service.

DESCRIPTION OF DRAWINGS

FIG. 1 item 10 shows an inflated, vulcanized reinforced rubber structure 16 mounted and inflated on rim 18 and centered inside a tread mold 12 disposed only in the tread region, thereby leaving the exterior surface of the inflated rubber structure between the mold and the rim exposed. The empty cavity 14 is formed between the inflated vulcanized reinforced rubber structure 16 and the tread mold 12. This cavity 14 is being filled with liquid polyurethane 22 through nozzle 20. When the cavity 14 is filled completely, the liquid polyurethane 22 is formulated to solidify exactly reproducing the tread pattern in mold 12 and adhering to the reinforced rubber structure 16. After the polyurethane 22 solidifies, the mold 12 can be opened and the completed tire having a reinforced rubber structure and a polyurethane tread can be removed.

DETAILED DESCRIPTION

Since the process of this invention utilizes a rubber structure without a tread component, the rubber structure can be vulcanized in less time then a rubber tire having a tread component. Shorter vulcanization time translates to fewer molds required for the same output reducing mold investment.

Since the process of this invention utilizes a mold without a tread pattern, the un-vulcanized reinforced rubber structure can be built to a larger diameter than a conventional rubber tire and still fit into the mold. The rubber structure built at a larger diameter requires less expansion or stretching to contact the mold's surface thereby reducing undesirable internal stresses and deformations within the rubber structure.

Since the process of this invention applies the tread component as a polyurethane liquid which subsequently solidifies, none of the internal stresses present in rubber treaded tires exist in polyurethane treaded tires. The liquid polyurethane exactly conforms to the tread pattern in the mold perfectly reproducing it on the tire.

Although a rubber treaded tire can never be as round as the mold in which it was vulcanized every tire produced with the process of this invention can be as round as the mold which produced it. This is possible because the reinforced rubber structure is inflated to field operating pressure within the mold and liquid polyurethane fills the space between the imperfect rubber structure and the round mold having the tread pattern. After the completed tire is removed from the mold and reinflated to field operating pressure the tire will be as round as the mold and the footprint size and shape will be more precisely controlled than it can be with a rubber treaded tire.

The preferred embodiments of the invention are the following. The rubber structure is assembled without a tread component and vulcanized in a mold having no tread pattern. The mold can have knurling or texturizing to promote adhesion to the polyurethane tread.

The tread area of the vulcanized rubber structure is cleaned to remove mold release from the vulcanization process and buffed to promote adhesion to the polyurethane tread.

A suitable rubber to polyurethane adhesive is uniformly applied to the tread area of the vulcanized rubber structure. The rubber structure is heated to remove volatiles from the adhesive and to promote adhesion of polyurethane to rubber.

The rubber component is inflated, preferably to tire operating pressure in the field, inside a mold having the desired tread pattern and heated to the optimum reaction temperature for the specific polyurethane being used. Liquid polyurethane, preferably heated, is poured or injected into the mold filling the space between the heated and inflated rubber structure and the heated mold. After the polyurethane has solidified the completed tire is removed from the mold.

The completed tire can be heated for a period of time to complete chemical reactions and optimize field performance.

The invention claimed is:

1. A method of manufacturing a new pneumatic tire comprising a newly manufactured reinforced vulcanized rubber structure and a newly manufactured polyurethane tread, comprising:

provding the reinforced vulcanized rubber structure mounted on a rim and inflated to operating pressure in the field inside a mold disposed only in the tread region and having a desired tread pattern, thereby leaving the exterior surface of the inflated rubber structure between the mold and the rim exposed, pouring or injecting a liquid polyurethane into the mold filling the space between the rubber structure inflated to said operating pressure in the field and the mold, maintaining the inflation pressure at said operating pressure in the field during solidification of the polyurethane to obtain a completed tire and then removing the completed tire from the mold, wherein, when the completed tire is reinflated to said operating pressure in the field, the tire is as round as the mold in which it was made and has a precisely controlled footprint size and shape.

2. The method of claim 1 wherein the rubber structure is vulcanized in a mold having knurling or texturizing to promote adhesion to the polyurethane tread.

3. A tire made by the method of claim 1.

4. A tire made by the method of claim 2.

* * * * *

UNITED STATES PATENT AND TRADEMARK OFFICE
CERTIFICATE OF CORRECTION

PATENT NO. : 8,151,840 B2  
APPLICATION NO. : 12/009917  
DATED : April 10, 2012  
INVENTOR(S) : Frederick Forbes Vannan and Mark Howard Dickerhoof Page 1 of 1

It is certified that error appears in the above-identified patent and that said Letters Patent is hereby corrected as shown below:

Title page, item [76] inventor: change spelling from Mark Howard Dickerhoff to Mark Howard Dickerhoof Signed and Sealed this  
Third Day of July, 2012

David J. Kappos  
*Director of the United States Patent and Trademark Office*